(12) United States Patent
LeVey

(10) Patent No.: US 7,458,759 B2
(45) Date of Patent: Dec. 2, 2008

(54) THREADED FASTENER WITH DUAL REINFORCING LEADS FOR FACILITATING MANUFACTURE OF THE FASTENER, THREAD ROLLING DIE FOR FORMING THE THREADED FASTENER, AND METHOD OF MANUFACTURING THE THREADED FASTENER

(75) Inventor: Kenneth R. LeVey, West Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/323,265

(22) Filed: Dec. 18, 2002

(65) Prior Publication Data

US 2004/0120790 A1   Jun. 24, 2004

(51) Int. Cl.
*F16B 33/02*   (2006.01)
(52) U.S. Cl. ..................................... 411/412
(58) Field of Classification Search ................. 411/309, 411/310, 311, 411, 412, 413
See application file for complete search history.

(56) References Cited

U.S. PATENT DOCUMENTS

| | | | |
|---|---|---|---|
| 3,207,023 A * | 9/1965 | Knohl | 411/387.3 |
| 3,258,797 A | 7/1966 | Budd | |
| 3,661,194 A | 5/1972 | MacFarlane et al. | |
| 4,034,641 A | 7/1977 | Williams, Jr. et al. | |
| 4,040,328 A | 8/1977 | Muenchinger | |
| 4,144,795 A * | 3/1979 | Gutshall | 411/413 |
| 4,430,036 A | 2/1984 | Chapman | |
| 4,486,135 A | 12/1984 | Kazino | |
| 4,637,767 A | 1/1987 | Yaotani et al. | |
| 4,652,194 A | 3/1987 | Tajima et al. | |
| 4,716,751 A | 1/1988 | Wozniak | |
| 4,718,802 A | 1/1988 | Rockenfeller et al. | |
| 4,793,219 A | 12/1988 | Wozniak | |
| 4,793,220 A | 12/1988 | Yamamoto et al. | |
| 4,820,098 A | 4/1989 | Taubert et al. | |
| 4,842,467 A | 6/1989 | Armstrong | |
| 5,044,853 A | 9/1991 | Dicke | |
| 5,061,136 A | 10/1991 | Dixon et al. | |
| 5,110,245 A | 5/1992 | Hiroyuki | |
| 5,188,496 A | 2/1993 | Giannuzzi | |
| 5,282,708 A | 2/1994 | Giannuzzi | |
| 5,294,227 A | 3/1994 | Forster et al. | |
| 5,385,439 A | 1/1995 | Hurdle | |
| RE34,969 E | 6/1995 | Dixon et al. | |
| 5,569,009 A * | 10/1996 | Suzuki | 411/413 |
| 5,674,035 A | 10/1997 | Hettich et al. | |

(Continued)

FOREIGN PATENT DOCUMENTS

DE   26 03 217   8/1977

(Continued)

*Primary Examiner*—Flemming Saether
(74) *Attorney, Agent, or Firm*—Law Offices of Steven W. Weinrieb

(57) ABSTRACT

A new and improved threaded fastener comprises a first, primary thread lead, and a pair of second, auxiliary thread leads alternatively interposed between successive threads of the first, primary thread lead. As a result of the provision of the pair of second, auxiliary thread leads being interposed between successive ones of the threads of the first, primary thread lead, the formation of the first, primary threaded lead, upon the threaded fastener, is facilitated.

7 Claims, 2 Drawing Sheets

U.S. PATENT DOCUMENTS

| | | |
|---|---|---|
| 5,743,914 A | 4/1998 | Skiba |
| 5,827,030 A | 10/1998 | Dicke |
| 5,885,041 A | 3/1999 | Giannuzzi et al. |
| 5,897,280 A | 4/1999 | Dicke |
| 5,921,735 A | 7/1999 | Hughes |
| 5,957,646 A | 9/1999 | Giannuzzi et al. |
| 5,961,267 A | 10/1999 | Goss et al. |
| 6,045,312 A | 4/2000 | Hsing |
| 6,056,491 A | 5/2000 | Hsu |
| 6,086,302 A | 7/2000 | Gerhard |
| 6,250,866 B1 | 6/2001 | Devine |
| 6,254,327 B1 | 7/2001 | Chen |
| 6,296,433 B1 | 10/2001 | Forsell et al. |
| 6,340,277 B1 | 1/2002 | Koenig et al. |
| 6,371,709 B1 * | 4/2002 | Papafotiou et al. .......... 411/412 |
| 6,419,435 B1 | 7/2002 | Gaudron |
| 6,516,650 B1 * | 2/2003 | Watanabe .................... 72/469 |

FOREIGN PATENT DOCUMENTS

| | | |
|---|---|---|
| EP | 0 494 651 | 7/1992 |
| GB | 2 325 288 | 11/1998 |

* cited by examiner

THREADED FASTENER WITH DUAL REINFORCING LEADS FOR FACILITATING MANUFACTURE OF THE FASTENER, THREAD ROLLING DIE FOR FORMING THE THREADED FASTENER, AND METHOD OF MANUFACTURING THE THREADED FASTENER

FIELD OF THE INVENTION

The present invention relates generally to threaded fasteners, and more particularly to a new and improved threaded fastener which has reinforcing lead structure integrally incorporated thereon for facilitating and easing the manufacture of the threaded fastener, a thread rolling die for forming the threaded fastener, and a method of manufacturing the threaded fastener.

BACKGROUND OF THE INVENTION

One method or technique for conventionally forming threaded fasteners comprises the rolling of a blank member between a pair of thread rolling dies as is disclosed, for example, within U.S. Pat. No. 4,716,751 which issued to Wozniak on Jan. 5, 1988. In accordance with such a conventional manufacturing method or technique for forming threaded fasteners, as illustrated, for example, within FIGS. 1-3, which correspond to FIGS. 1,1a, and 2 of the aforenoted patent, a blank member 9 is adapted to be interposed between a pair of thread rolling dies 10,10a wherein, for example, a first one of the thread rolling dies 10 comprises a moving die while the second one of the thread rolling dies 10a comprises a stationary die. Each one of the thread rolling dies 10,10a comprises a tool steel body 11 having a working face 12, and as best seen in FIGS. 1 and 3, and as described in connection with the thread rolling die 10, the working face 12 is provided with a plurality of die threads 13 which extend from a start end 14 of the thread rolling die 10 toward a finish end 16 of the thread rolling die 10, and which are disposed at a predetermined angle with respect to the axial or longitudinal extent or axis L of the thread rolling die 10 in order to in fact form the threads upon the blank member 9.

As the blank member 9 is rolled between the two thread rolling dies 10,10a from the start end 14 of the thread rolling die 10 toward the finish end 16 of the thread rolling die 10, the material comprising the blank member 9 is progressively displaced and flows into or between the thread rolling die threads 13 whereby fully formed threads, which mate with or correspond to the thread rolling die threads 13 of the thread rolling dies 10,10a, are produced upon the blank member 9. More particularly, as can best be appreciated from FIG. 3, each one of the thread rolling die threads 13 comprises a plurality of crest portions 17, which are adapted to penetrate the blank member material during the thread rolling operation so as to effectively and ultimately form the root portions of the threads upon the blank member 9, and a plurality of root portions 19 which are adapted to ultimately form the crest portions of the threads upon the blank member 9 at the completion of the thread rolling operation. Lastly, flank portions 18 of the thread rolling die threads 13 define surfaces along which the blank member material flows during the formation of the crest and root portions of the threads upon the blank member 9, and the flank portions 18 of the thread rolling die threads 13 likewise form corresponding thread flank portions upon the blank member 9. It is further noted that as the rolling process proceeds, the material comprising the blank member continues to be displaced along the flank portions 18 of the thread rolling die threads 13 with the depth of penetration increasing as the rolling process continues until a fully formed thread is produced upon the blank member 9 at the finish ends 16 of the thread rolling dies 10,10a.

With reference now being made to FIG. 4, there is disclosed a conventional threaded fastener 100 which is known in the industry as a "hi-low" thread form in view of the fact that the same comprises two different thread leads, that is, a first, primary thread lead 102, and a second, auxiliary thread lead 104 which provides reinforcement characteristics to the threaded fastener 100. The primary and auxiliary thread leads 102,104 are disposed upon the threaded fastener 100 in such a manner that successive portions of the auxiliary thread lead 104 are interposed between successive portions of the primary thread lead 102 along the axial extent of the threaded fastener 100, and it is particularly noted that the axial distance or pitch, as defined between each set of primary and auxiliary thread leads 102, 104, is denoted by P, while the axial distance or pitch, as defined between, for example, successive primary or successive auxiliary thread leads 102,102 or 104,104, is 2P. The root portion of the threaded fastener 100 is disclosed at 106, and it is noted that the crest height of the first, primary thread lead 102, as measured from the root portion 106 of the threaded fastener 100, is adapted to be at least twice the crest height of the second, auxiliary thread lead 104 as similarly measured from the root portion 106 of the threaded fastener 100. One of a pair of thread rolling dies, for forming the primary and auxiliary thread leads 102,104 upon a fastener blank member 108 in a manner similar to the aforenoted use of thread rolling dies 10,10a in connection with the formation of the threads upon the fastener blank member 9, is disclosed at 110, and it is seen that in order to ultimately form the primary and auxiliary thread leads 102,104 upon the fastener blank member 108, the thread rolling die 110 comprises a plurality of primary thread rolling die threads 112, and a plurality of auxiliary thread rolling die threads 114. In a manner corresponding to the alternative disposition of the first, primary thread leads 102 and the second, auxiliary thread leads 104 upon the threaded fastener 100, the plurality of primary thread rolling die threads 112 and the plurality of auxiliary thread rolling die threads 114 are similarly disposed in an alternative manner upon the thread rolling die 110.

More particularly, in connection with each one of the thread rolling die threads 114, it is seen that the crest portion of each auxiliary thread rolling die thread 114 actually comprises a pair of crest portions 114a,114b, wherein each one of the crest portions 114a,114b of each auxiliary thread rolling die thread has a lateral or transverse extent of between 0.003-0.010 inches, and wherein further, the crest portions 114a, 114b are laterally or transversely spaced from each other by means of a predetermined distance so as to in fact form each one of the second, auxiliary thread leads 104 therebetween during the thread rolling process. In particular, recalling the fact that the depth of penetration of the thread rolling dies increases as the thread rolling process continues, and appreciating the additional fact that each one of the thread rolling die threads 112,114 is disposed at a predetermined angle with respect to the longitudinal or axial extent or axis of the thread rolling die 110, then it can be appreciated further that in order to fully form the first, primary thread lead 102 upon the threaded fastener 100, after the second, auxiliary thread lead 104 has been formed so as to have a predetermined depth, a predetermined amount of blank member material 116 must be displaced or moved a predetermined lateral or transverse distance during the thread rolling operation.

It is also conventionally known, however, that, in accordance with thread rolling manufacturing techniques, and the practical limitations inherently associated therewith, a predetermined amount of blank member material can only be displaced a predetermined distance during each rotation or revolution of the blank member along the pair of cooperating thread rolling dies in order to in fact achieve good, reliable, straight threads upon the blank member. Consequently, the greater the distance that the blank member material must be displaced, the greater the number of rotations or revolutions that the blank member must undergo during the thread rolling process until the thread leads are fully formed upon the original blank member. Accordingly, if the blank member must undergo a substantially large number of rotations or revolutions, then the longitudinal or axial length of each thread rolling die must be substantially large which, in turn, requires the use of a substantially large thread rolling machine which renders the manufacture of the threaded fasteners relatively costly.

Since the practical problem in connection with the formation of, for example, the first, primary thread lead 102 upon the fastener blank member 108 resides in, or is a function of, the pitch spacing 2P between successive threads of the first, primary thread lead 102, and therefore the distance through which the blank material must be moved or displaced during the thread rolling process in order to form the successive threads of the first, primary thread lead 102, then one solution to this problem might be to shorten the pitch spacing between successive threads of the first, primary thread lead 102. The shortening of the pitch spacing between successive threads of the first, primary thread lead 102 would, however, increase the number of threads per inch that would be present upon the threaded fastener 100. This alteration in the number of threads per inch, as present upon the threaded fastener 100, however, adversely alters the operational characteristics of the threaded fastener 100, such as, for example, the amount of insertion torque required in connection with the driving of the threaded fastener into a substrate, the amount of time it takes to insert or drive the threaded fastener 100 into the substrate, the pull-out resistance of the threaded fastener 100 with respect to the substrate, and the like.

A need therefore exists in the art for a new and improved threaded fastener, a new and improved thread rolling die for forming the new and improved threaded fastener, and a new and improved method or technique of manufacturing the new and improved threaded fastener whereby the manufacturing process can be readily facilitated in view of the fact that, during the formation of the predetermined number of threads per inch comprising the thread leads of the threaded fastener in accordance with the thread rolling process, the blank member material only needs to effectively be displaced or moved through a smaller lateral or transverse distance in order to complete the formation of the thread leads upon the blank member such that, in turn, the longitudinal or axial length of the thread rolling dies can be substantially shortened so as to, in turn, require the use of a substantially shortened thread rolling machine which renders the manufacture of the threaded fasteners more cost effective.

OBJECTS OF THE INVENTION

Accordingly, it is an object of the present invention to provide a new and improved threaded fastener, a new and improved thread rolling die for forming the new and improved threaded fastener, and a new and improved method or technique of manufacturing the new and improved threaded fastener.

Another object of the present invention is to provide a new and improved threaded fastener, a new and improved thread rolling die for forming the new and improved threaded fastener, and a new and improved method or technique of manufacturing the new and improved threaded fastener whereby the various drawbacks or disadvantages characteristic of PRIOR ART threaded fasteners, PRIOR ART thread rolling dies for forming such PRIOR ART threaded fasteners, and PRIOR ART methods or techniques of manufacturing such PRIOR ART threaded fasteners, are effectively overcome.

An additional object of the present invention is to provide a new and improved threaded fastener, a new and improved thread rolling die for forming the new and improved threaded fastener, and a new and improved method or technique of manufacturing the new and improved threaded fastener wherein the manufacture of the new and improved threaded fastener is facilitated.

A further object of the present invention is to provide a new and improved threaded fastener, a new and improved thread rolling die for forming the new and improved threaded fastener, and a new and improved method or technique of manufacturing the new and improved threaded fastener wherein the manufacture of the new and improved threaded fastener is facilitated such that relatively smaller or shorter thread rolling dies are able to be employed in connection with the manufacture of the threaded fasteners.

A last object of the present invention is to provide a new and improved threaded fastener, a new and improved thread rolling die for forming the new and improved threaded fastener, and a new and improved method or technique of manufacturing the new and improved threaded fastener wherein the manufacture of the new and improved threaded fastener is facilitated such that relatively smaller or shorter thread rolling dies are able to be employed in connection with the manufacture of the threaded fasteners such that, in turn, relatively smaller or shortened thread rolling machines are able to be utilized which render the manufacture of the threaded fasteners more cost effective.

SUMMARY OF THE INVENTION

The foregoing and other objectives are achieved in accordance with the teachings and principles of the present invention through the provision of a new and improved thread rolling die for forming a new and improved threaded fastener, and a new and improved method or technique of manufacturing the new and improved threaded fastener, wherein the new and improved threaded fastener comprises a first, primary thread lead, and a pair of second, auxiliary thread leads alternatively interposed between successive threads of the first, primary thread lead. As a result of the provision of the pair of second, auxiliary thread leads being interposed between successive ones of the threads of the first, primary thread lead, not only is additional axial reinforcement provided for the threaded fastener, but more importantly, the lateral or transverse distance through which the material comprising the blank member must be displaced or moved in order to form the successive threads of the first, primary thread lead is substantially reduced. Such a substantial reduction in the distance through which the material of the blank member must be moved or displaced permits the number of revolutions, through which the blank member must be rotated in order to permit the complete formation of the thread leads upon the blank member, to be accordingly reduced which, in turn, permits the axial length of the thread rolling dies to be reduced. In this manner, substantially smaller thread rolling machines are able to be used in connection with the manufacture of the threaded fasteners so as to render the manufacturing processes more cost effective.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
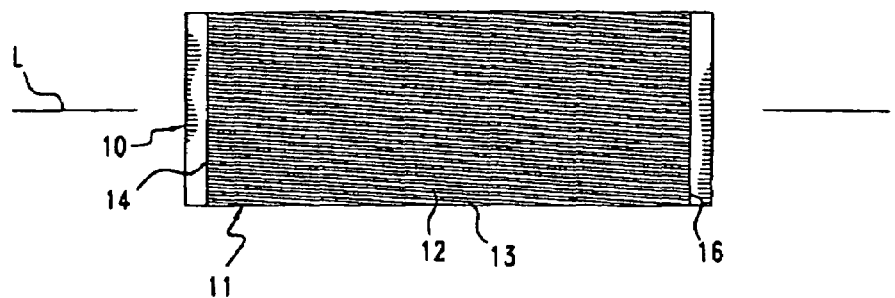
FIG. 1 is a top plan view of a conventional PRIOR ART thread rolling die.
Figure 2:
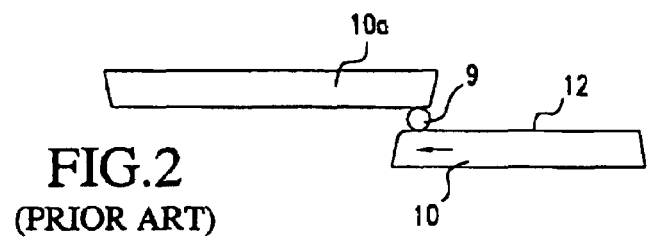
FIG. 2 is a side elevational view of a pair of conventional PRIOR ART thread rolling dies, of the type illustrated within FIG. 1, showing the use of the same in performing a thread rolling process in conjunction with a blank member interposed between the pair of conventional PRIOR ART thread rolling dies.
Figure 3:
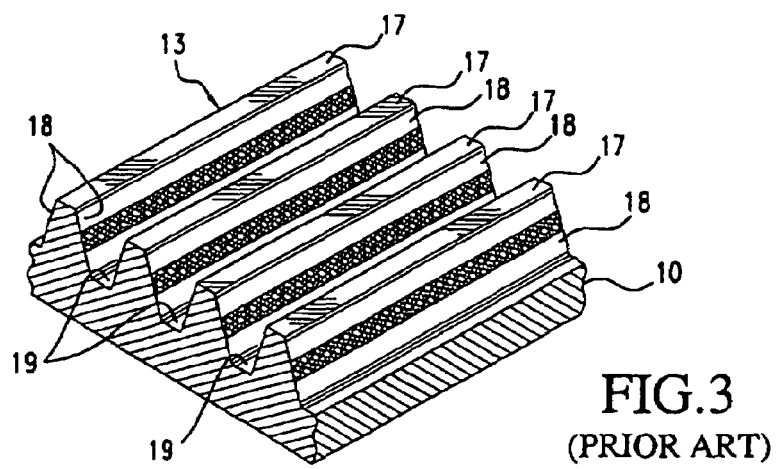
FIG. 3 is a perspective view, partly in cross-section, of the conventional PRIOR ART thread rolling die illustrated within FIG. 1.
Figure 4:
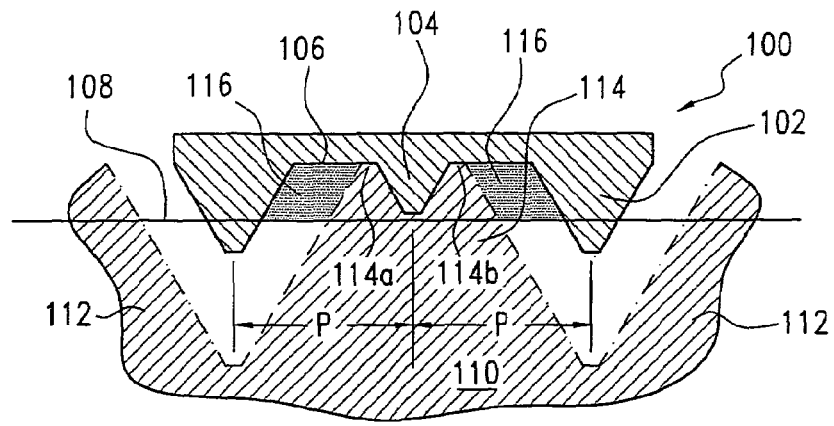
FIG. 4 is a schematic view showing one of a pair of conventional PRIOR ART thread rolling dies which is utilized for forming a conventional "hi-low" thread form upon a blank member, wherein the "hi-low" thread comprises a first, primary thread lead and a second, auxiliary thread lead, and wherein further, successive threads of the first, primary and second, auxiliary thread leads are formed at alternative axial positions along the blank member.
Figure 5:
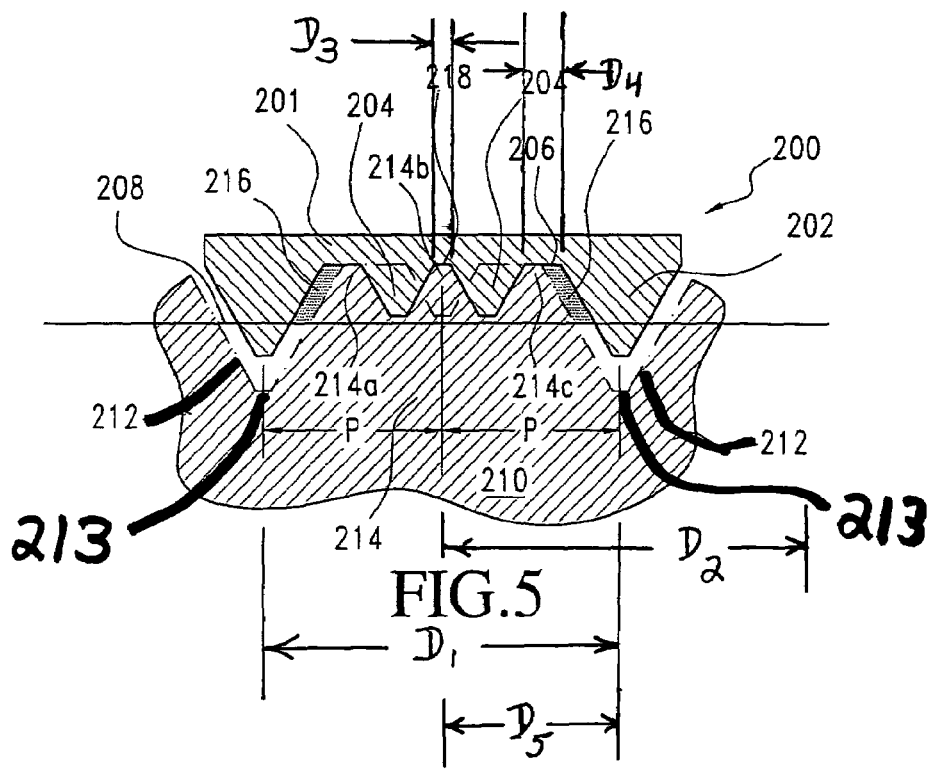
FIG. 5 is a schematic view, similar to that of FIG. 4, showing, however, one of a pair of new and improved thread rolling dies, constructed in accordance with the principles and teachings of the present invention, which is utilized for forming a new and improved "hi-low" thread form upon a blank member, wherein the "hi-low" thread comprises a first, primary thread lead and a pair of second, auxiliary thread leads, wherein further, successive threads of the first, primary and second, auxiliary thread leads are formed at alternative axial positions along the blank member, and wherein still further the incorporation of the pair of second, auxiliary thread leads upon the blank member effectively reduces the lateral or transverse distance through which material comprising the blank member must be displaced or moved in order to form the first, primary thread lead upon the blank member whereby shorter or smaller thread rolling dies can be utilized for forming the threaded fasteners, whereby, in turn, smaller or shorter thread rolling machines are able to be utilized, thereby rendering the thread rolling processes more cost effective to perform.

Referring now to the drawings, and more particularly to FIG. 5 thereof, there is disclosed a new and improved threaded fastener which has been developed in accordance with the principles and teachings of the present invention and which is generally indicated by the reference character 200. It is to be appreciated that in view of the fact that the new and improved threaded fastener 200 of the present invention, as well as the thread rolling dies 210 utilized in connection with the formation of the threaded fastener 200, are similar to the conventional threaded fastener 100 and the thread rolling dies 110 utilized in connection with the formation of the conventional threaded fastener 100, except as will be more specifically noted hereinafter, the threaded fastener 200 of the present invention, the thread rolling dies 210, and the various components of such structures will be denoted by reference characters which correspond to the reference characters used in connection with the description of the conventional threaded fastener 100 and the thread rolling dies 110 used in connection with the fabrication of the same, however, the reference characters used in connection with the description of the new and improved threaded fastener 200 of the present invention, as well as in connection with the description of the new and improved thread rolling dies 210 used in connection with the fabrication of the new and improved threaded fastener 200, will be within the 200 series. As was the case with the conventional threaded fastener 100, the threaded fastener 200 of the present invention is of the type which is known in the industry as a "hi-low" thread form in view of the fact that the same substantially comprises a shank portion 201 upon which two different thread leads, that is, a first, primary thread lead 202, and a second, auxiliary thread lead 204 which provides reinforcement characteristics to the threaded fastener 200. It is noted, however, that, in accordance with the particularly unique structural characteristics of the threaded fastener 200 of the present invention, in lieu of the provision of a single second, auxiliary thread lead upon the threaded fastener 200, as was the case with the conventional threaded fastener 100, there is provided a pair of axially spaced second, auxiliary thread leads 204, the significance of which will become more apparent hereinafter.

More particularly, it is seen that the primary and dual auxiliary thread leads 202,204 are disposed upon the threaded fastener 200 in such a manner that successive portions or threads of the pair of auxiliary thread leads 204 are interposed between successive portions or threads of the primary thread lead 202 along the axial extent of the threaded fastener 200. In particular, it is especially noted that the axial distance or pitch, as defined between each set of primary and auxiliary thread leads 202,204, is the same as the axial distance or pitch, as defined between each set of primary and auxiliary thread leads 102,104 which was characteristic of the conventional threaded fastener 100, and is accordingly denoted by the reference character P, while the axial distance or pitch, as defined between, for example, successive primary thread leads 202,202, or between, for example, successive sets of the auxiliary thread leads 204,204, is the same as the axial distance or pitch, as defined between, for example, successive primary thread leads 102,102, or between, for example, successive auxiliary thread leads 104,104 which was characteristic of the conventional threaded fastener 100 and is accordingly denoted by the reference character 2P. The root portion of the threaded fastener 200 is disclosed at 206, and it is noted that, as was the case with the conventional threaded fastener 100, the crest height of the first, primary thread lead 202, as measured from the root portion 266 of the threaded fastener 200, is adapted to be at least twice the crest height of the pair of second, auxiliary thread leads 204 as similarly measured from the root portion 206 of the threaded fastener 200.

One of a pair of thread rolling dies, for forming the primary and auxiliary leads 202,204 upon a fastener blank member 208, in a manner similar to the aforenoted use of the thread rolling dies 10,10a,110 in connection with the formation of the threads upon the fastener blank members 9,108, is disclosed at 210, and it is seen that in order to ultimately form the primary and auxiliary thread leads 202,204 upon the fastener blank member 208, the thread rolling die 210 comprises a plurality of primary thread rolling die threads 212, and a plurality of auxiliary thread rolling die threads 214. In particular, in a manner corresponding to the alternative disposition of the first, primary thread leads 202 and the set of second, auxiliary thread leads 204 upon the threaded fastener 200, the plurality of primary thread rolling die threads 212 and the plurality of auxiliary thread rolling die threads 214 are alternatively disposed upon the thread rolling die 210. More particularly, it is seen that the plurality of primary thread rolling die threads 212 are spaced apart from each other, as defined, for example, between successive root portions 213 of the plurality of primary thread rolling die threads 212, through means of a first predetermined distance $D_1$, so as to correspondingly define the crest portions of the primary thread leads 202 with first predetermined pitch distances $D_1$ therebetween. In connection with each one of the auxiliary thread rolling die threads 214 for forming the unique and novel set or pair of second, auxiliary thread leads 204 upon the blank member 208 in conjunction with the ultimate formation of the threaded fastener 200, it is seen that the crest portion of each auxiliary thread rolling die thread 214 actually comprises three crest portions 214a,214b,214c which are spaced from each other by means of predetermined distances so as to in fact form each one of the pair of second, auxiliary thread leads 204,204 therebetween during the thread rolling process of the fastener blank. More particularly, it is seen that successive ones of the plurality of sets of auxiliary thread rolling die threads 214, as defined, for example, between successive central crest portions 214b of the auxiliary thread rolling die threads 214, are spaced apart from each other through means of a second predetermined distance $D_2$ which is substantially equal to the aforenoted first predetermined distances $D_1$ so as to correspondingly define the pairs of second, auxiliary thread leads 204,204 wherein sets of the pairs of second, auxiliary thread leads 204,204 are axially spaced apart from each other with second predetermined pitch distances $D_2$ therebetween. As was the case with each one of the crest portions 114a,114b of the conventional thread rolling die 110, each one of the crest portions 214a,214b,214c has a lateral or transverse extent $D_3$ of between 0.003-0.010 inches, so as to correspondingly define the central root portion of the second auxiliary thread lead, defined between each pair of adjacent second, auxiliary thread leads 204, with the axial extent $D_3$. Still further, it is seen that the transversely or laterally outer crest portions 214a,214c of the auxiliary thread rolling die threads 214 are spaced predetermined distances from their respectively adjacent root portions 213 of the primary thread rolling die threads 212 such that the root portions of the fastener 200, defined between each one of the pair of second, auxiliary thread leads 204, 204 and a respective adjacent one of the threads of the first, primary thread lead 202, have an axial extent $D_4$ which is greater than the axial extent $D_3$ of the central root portion of the second auxiliary thread lead defined between each pair of adjacent second, auxiliary thread leads 204, 204. Lastly, it is noted that the central crest portion 214b of each set of auxiliary thread rolling die threads 214 is spaced apart from an adjacent one of the root portions 213 of the plurality of primary thread rolling die threads 212 through means of a fifth predetermined distance $D_5$ such that the central root portion of the second auxiliary thread leads 204, 204 is axially spaced a fifth predetermined axial extent $D_5$ from an adjacent crest portion of one of the threads of the first, primary thread lead 202. It is also noted that the fifth axial extent $D_5$ is one-half the axial pitch distance $D_1$ defined between successive crest portions of adjacent threads of the first primary thread lead 202, all as can readily be appreciated from FIG. 5.

The significance of providing each one of the auxiliary thread rolling die threads 214, so as to effectively comprise three, laterally or transversely spaced crest portions 214a, 214b,214c for thereby forming the dual set or pair of second, auxiliary thread leads 204,204 upon the blank member 208, which is ultimately used to form the new and improved threaded fastener 200, will now be addressed. In particular, it has been noted that the depth of penetration of the thread rolling dies increases as the thread rolling process continues in order to ultimately form, or complete the formation of the first, primary thread lead upon the blank member, once the formation of, for example, the second, auxiliary thread lead has been formed so as to have a predetermined depth or crest height dimension. It is additionally noted that, as was the case with each one of the thread rolling die threads 112,114, each one of the thread rolling dies threads 212,214 is disposed at a predetermined angle with respect to the longitudinal or axial extent or axis of the thread rolling die 210. Consequently, it can be appreciated further that in order to fully form the first, primary thread lead 202 upon the blank member 208 which will ultimately serve as the threaded fastener 200, a predetermined amount of blank member material 216 must be moved or displaced a predetermined lateral or transverse distance.

It is to be additionally recalled that, as is conventionally known in accordance with thread rolling manufacturing techniques and the practical limitations inherently associated therewith, a predetermined amount of blank member material can only be displaced a predetermined distance during each rotation or revolution of the blank member along the pair of cooperating thread rolling dies in order to in fact achieve good, reliable, straight threads upon the blank member. Accordingly, it has also been heretofore noted that the greater the distance that the blank member material must be moved or displaced during, for example, the complete formation of the primary thread lead upon the blank member, the greater the number of rotations or revolutions that the blank member must undergo during the thread rolling process until the primary thread lead is fully formed upon the original blank member. Still further, if the blank member must undergo a substantially large number of rotations or revolutions during the thread rolling process, then the longitudinal or axial length of each thread rolling die must be substantially large which, in turn, requires the use of a substantially large thread rolling machine which renders the manufacture of the threaded fasteners relatively costly.

It has also been noted that since the practical problem in connection with the formation of, for example, the first, primary thread lead 202 upon the fastener blank member 208 resides in the fact that the pitch spacing defined between successive threads of the first, primary thread lead 202 is 2P, and that the distance through which the material of the blank member must therefore be moved or displaced during the thread rolling process is a function of such pitch spacing 2P, then the solution to this problem would seem to be to effectively reduce or shorten the distance, defined between the successive threads of the first, primary thread lead 202, through which the material of the blank member 208 needs to be displaced or moved in conjunction with the complete formation of the first, primary thread lead 202 and the successive threads thereof during the thread rolling process. The shortening of the actual pitch spacing 2P between successive threads of the first, primary thread lead 202 has been noted as not being a viable solution to the aforenoted problem in view of the fact that such would increase the number of threads per inch of the threaded fastener 200 which would, in turn, adversely alter the operational characteristics of the threaded fastener 200. However, as a result of the provision of the dual set or pair of second, auxiliary thread leads 204,204, which are axially spaced apart through means of a predetermined distance or space 218 of, for example, 0.003-0.010 inches, within the same space defined between successive threads of the first, primary thread lead 202, that is, within the same distance or lineal pitch dimension 2P, the effective distances 216,216, through which the material of the blank member 208 must be correspondingly moved or displaced in connection with the formation of the successive threads of the first, primary thread lead 202, are able to be substantially or significantly reduced. Accordingly, it can be appreciated, that in light of the foregoing, the provision of the dual set or pair of second, auxiliary thread leads 204,204 upon the threaded fastener 200 is seen to comprise a means for facilitating the formation of the first, primary thread lead 202 upon the threaded fastener 200.

Since such distances 216,216, through which the material of the blank member 208 must be correspondingly moved or displaced in connection with the formation of the successive threads of the first, primary thread lead 202, are able to be substantially or significantly reduced, the number of rotations or revolutions that the blank member 208 must undergo during the en-tire thread rolling process in order to in fact achieve the complete formation of the first, primary thread lead 202, is able to be proportionally reduced. Accordingly, the longitudinal or axial length of each thread rolling die can be proportionally reduced or shortened whereby, in turn, the use of a substantially reduced or smaller thread rolling machine is able to be correspondingly employed which renders the manufacture of the threaded fasteners 200 more cost effective. In addition, the provision of the dual set or pair of second, auxiliary thread leads 204,204 upon the threaded fastener 200 increases the axial reinforcement characteristics imparted to the threaded fastener 200 over the axial extent thereof.

Thus, it may be seen that in accordance with the principles and teachings of the present invention, there has been developed a new and improved threaded fastener, a new and improved thread rolling die, and a new and improved technique or method of manufacturing threaded fasteners, the thread rolling process or technique is substantially facilitated in that the same is able to be more readily achieved and within a shorter period of time due to the fact that the blank member needs to be rotated or revolved through means of a reduced number of rotations or revolutions. Accordingly, the axial extent or longitudinal length of the rolling dies is able to be correspondingly shortened, the size of the thread rolling machine is able to be correspondingly shortened, and the manufacturing process or technique is rendered more cost effective. Still further, additional reinforcement is imparted to the threaded fasteners over their entire axial extents which likewise serves to positively enhance the strength characteristics of the fastener in connection with their insertion and disposition within the associated substrates.

Obviously, many variations and modifications of the present invention are possible in light of the above teachings. For example, while particular dimensions of the threaded fastener, the axial distances defined between successive threads, or the relative sizes of the thread leads, have been noted, such dimensions, distances, or sizes can of course be altered as may be desired in order to correspondingly alter the performance characteristics of the threaded fastener without departing from the principles and teachings of the present invention. It is therefore to be understood that within the scope of the appended claims, the present invention may be practiced otherwise than as specifically described herein.

What is claimed as new and desired to be protected by Letters Patent of the United States of America, is:

1. A threaded fastener formed from a blank member by means of thread rolling dies manipulated in accordance with a thread rolling process, comprising:
   a shank portion having an axial extent defined around a longitudinal axis;
   a first, primary thread lead defined upon said shank portion and comprising a plurality of first, primary threads which are successively defined upon said shank portion at positions which are spaced from each other by first predetermined axially spaced pitch distances, wherein each one of said first, primary threads also has a predetermined root diameter and a predetermined crest diameter; and
   a dual set of second, auxiliary thread leads defined upon said shank portion and comprising a plurality of pairs of second, auxiliary threads which are disposed adjacent to each other, wherein said pairs of second, auxiliary threads are successively defined upon said shank portion at positions which are interposed between said successive ones of said plurality of first, primary threads, wherein said pairs of second, auxiliary threads are spaced from each other by second predetermined axially spaced pitch distances, and wherein each one of said second, auxiliary threads is axially spaced from each other by a third predetermined axially spaced distance which is less than a fourth predetermined axially spaced distance, defined between each one of said second, auxiliary threads and an adjacent one of said first, primary threads, so as to facilitate the definition of said first, primary thread lead, comprising said plurality of first, primary threads, upon said shank portion, each one of said second, auxiliary threads also having a predetermined root diameter that is substantially the same as said predetermined root diameter of each one of said first, primary threads, and a crest diameter that is substantially less than said predetermined crest diameter of each one of said first, primary threads.

2. The threaded fastener as set forth in claim 1, wherein:
said first predetermined axially spaced pitch distances, defined between said plurality of successively disposed first, primary threads of said first, primary thread lead, are substantially equal to said second predetermined axially spaced pitch distances, defined between said dual sets of successively disposed second, auxiliary threads of said dual set of second, auxiliary thread leads.

3. The threaded fastener as set forth in claim 1, wherein:
said first predetermined axially spaced pitch distances, defined between said plurality of successively disposed first, primary threads of said first, primary thread lead, are equal to twice predetermined fifth axially spaced distances defined between each one of said dual sets of successively disposed second, auxiliary threads comprising said dual set of second, auxiliary thread leads and one of said plurality of successively disposed first, primary threads comprising said first, primary thread lead.

4. The threaded fastener as set forth in claim 1, wherein:
said third predetermined distances, defined between said second, auxiliary threads comprising each pair of said second, auxiliary threads comprising said dual set of second, auxiliary thread leads, are within the range of 0.003-0.010 inches.

5. The threaded fastener as set forth in claim 1, wherein:
each one of said plurality of first, primary threads, which comprise said first, primary thread lead, has a first predetermined radially outward extent which extends radially outwardly from a first root portion, defined at a first predetermined radially outward distance from said longitudinal axis of said shank portion, to a first crest portion located at a second predetermined radially outward distance from said longitudinal axis of said shank portion.

6. The threaded fastener as set forth in claim 5, wherein:
each one of said dual set of second, auxiliary threads, which comprise said dual set of second, auxiliary thread leads, has a second predetermined radially outward extent which extends radially outwardly from a second root portion, which is defined at said first predetermined radially outward distance from said longitudinal axis of said shank portion from which each one of said plurality of first, primary threads extends radially outwardly, to a second crest portion located at a third predetermined radially outward distance from said longitudinal axis of said shank portion which is less than said second predetermined radially outward distance characterizing said first crest portions of said first, primary threads.

7. The threaded fastener as set forth in claim 6, wherein:
the crest height of said plurality of first, primary threads, as measured from said first root portion of said shank portion of said threaded fastener, is at least twice the crest height of said dual sets of second, auxiliary threads as measured from said second root portion of said shank portion of said threaded fastener.

* * * * *